United States Patent [19]

Dames et al.

[11] Patent Number: 5,990,221
[45] Date of Patent: Nov. 23, 1999

[54] PREPARATION OF AQUEOUS POLYMER DISPERSIONS WITH A BIMODAL PARTICLE-SIZE DISTRIBUTION

[75] Inventors: Burkhardt Dames, Neuwied; Klemens Mathauer; Walter Mächtle, both of Ludwigshafen, all of Germany

[73] Assignee: BASF Aktiengesellschaft, Ludwigshafen, Germany

[21] Appl. No.: 08/889,591

[22] Filed: Jul. 8, 1997

[51] Int. Cl.$^6$ .................................................. C08J 3/02
[52] U.S. Cl. ..................... 524/457; 524/458; 524/507; 524/513; 524/523; 524/524; 524/832; 524/833
[58] Field of Search .................... 524/833, 458, 524/460, 832, 457, 507, 513, 523, 524

[56] References Cited

U.S. PATENT DOCUMENTS 4,254,004  3/1981  Abbey .
4,929,668  5/1990  Zeibig et al. .......................... 524/832
5,380,790  1/1995  Chen et al. ........................... 524/833

FOREIGN PATENT DOCUMENTS 2138830  10/1984  United Kingdom .

Primary Examiner—Judy M. Reddick
Attorney, Agent, or Firm—Oblon, Spivak, McClelland, Maier & Neustadt, P.C.

[57] ABSTRACT

A process for preparing aqueous polymer dispersions by emulsion polymerization of free-radically polymerizable compounds (monomers) comprises adding, during the polymerization of the monomers, a miniemulsion which is an aqueous, surfactant-stabilized emulsion of monomers whose emulsified droplets have a size of from 10 to 500 nm and which comprises a compound (stabilizer) which is dissolved in the monomers of the droplets and whose solubility in the monomers is at least twice its solubility in water.

2 Claims, No Drawings

PREPARATION OF AQUEOUS POLYMER DISPERSIONS WITH A BIMODAL PARTICLE-SIZE DISTRIBUTION

Preparation of aqueous polymer dispersions with a bimodal particle-size distribution The invention relates to a process for preparing aqueous polymer dispersions by emulsion polymerization. Generally the desire is for polymer dispersions of maximum solids content, ie. polymer content, so as to avoid unnecessary costs relating, for example, to transportation or to the removal of water after the polymer dispersions have been applied. Yet when the polymer dispersions are to be used, for example, as coating or impregnating compositions, it must at the same time be ensured that their viscosity is not too high, so that the polymer dispersions exhibit good flow and so that, for example, uniform coating is still possible at low film thicknesses.

It is known that high solids contents and low viscosities can be established by adding polymer latices during the emulsion polymerization of monomers.

Appropriate techniques are described, for example, in EP 81 083, EP-A-129 699 and EP-A-0 568 831.

The high solids contents and low viscosities obtained with these techniques are made possible, ultimately, by a bimodal size distribution of the polymer particles.

A disadvantage with these techniques is that the added polymer latex must first be prepared in a separate polymerization process, and then has a particle-size distribution which determines that of the polymer dispersion obtained in the course of subsequent emulsion polymerization.

For each desired particle-size distribution, then, it would be necessary to prepare and stock the individual corresponding polymer latex.

P. L. Tang, E. D. Sudol, C. A. Silebi and M. S. El-Aasser in Journal of Applied Polymer Science, Vol. 43, 1059–1066 (1991) and Vol. 42, 2019–2028 (1991) disclosed miniemulsions and their polymerization.

These miniemulsions are emulsions of monomers where a hydrophobic compound is dissolved in the monomer droplets.

The particle size of these miniemulsions depends essentially on the shear force exerted when the monomers are dispersed in water.

Miller, Sudol, Silesi and El-Aasser, in Macromolecules, 28, (1995) 2765–2771, show that miniemulsions containing dissolved polymer in the oil phase are able to undergo polymerization to form bimodal dispersions if only some of the initial droplets are initiated. Since the droplets are unable to dissolve completely owing to the dissolved polymer, the droplets which have not been initiated shrink to the benefit of the already growing polymer particles, and are initiated later, if at all. The result is a bimodal particle-size distribution. If sufficient initiator is used to initiate all the polymer particles, then monomodal dispersions are the result.

It is an object of the present invention to provide a process for preparing polymer dispersions of high solids content and low viscosity. The process should be extremely simple and should permit a great deal of flexibility in the preparation of polymer dispersions with different particle sizes.

We have found that this object is achieved by a process for preparing aqueous polymer dispersions by emulsion polymerization of free-radically polymerizable compounds (monomers), which comprises adding, before or during the polymerization of the monomers, a miniemulsion which is an aqueous, surfactant-stabilized emulsion of monomers whose emulsified droplets have a size of from 10 to 500 nm and which comprises a compound (co-stabilizer) which is dissolved in the monomers of the droplets and whose solubility in the monomers is at least twice its solubility in water.

We have also found polymer dispersions that are obtainable by this process.

With the novel process, there are no particular restrictions on the nature of the free-radically polymerizable compounds: it is possible to use all those monomers which are conventionally employed in emulsion polymerizations.

Preferably at least 50% by weight, and particularly preferably 70% by weight, of the total monomers used in the novel process are principal monomers selected from $C_1$–$C_{20}$-alkyl (meth)acrylates, vinyl esters of carboxylic acids with up to 20 carbons, vinyl-aromatic compounds having up to 20 carbons, ethylenically unsaturated nitriles, vinyl halides, vinyl ethers of $C_1$–$C_{10}$ alcohols, $C_2$–$C_8$ aliphatic hydrocarbons with 1 or 2 double bonds, or mixtures of these monomers.

Examples which may be mentioned are $C_1$–$C_{10}$-alkyl (meth)acrylates, such as methyl methacrylate, methyl acrylate, n-butyl acrylate, ethyl acrylate and 2-ethylhexyl acrylate.

Mixtures of the alkyl (meth)acrylates, in particular, are also suitable.

Examples of vinyl esters of $C_1$–$C_{20}$ carboxylic acids are vinyl laurate, stearate, propionate and acetate and Versatic acid vinyl ester.

Suitable vinyl-aromatic compounds are vinyltoluene, α- and p-methylstyrene, α-butylstyrene, 4-n-butylstyrene, 4-n-decyl-styrene and, preferably, styrene.

Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers are vinyl methyl ether and vinyl iso-butyl ether. Preference is given to vinyl ethers of $C_1$–$C_4$ alcohols.

$C_2$–$C_8$ hydrocarbons that may be mentioned, having two olefinic double bonds, are butadiene, isoprene and chloroprene; those with one double bond are, for example, ethene and propene.

In addition to these principal monomers it is possible to use further monomers, for example hydroxyl-containing monomers, especially $C_1$–$C_{10}$-hydroxyalkyl (meth) acrylates, (meth)acrylamide, ethylenically unsaturated acids, especially carboxylic acids, such as (meth)acrylic acid and itaconic acid, and anhydrides thereof, and dicarboxylic acids and their anhydrides or monoesters, for example maleic acid, fumaric acid and maleic anhydride.

Particularly preferred principal monomers are (meth) acrylates and vinyl-aromatic compounds and mixtures thereof.

In the course of the emulsion polymerization, surfactants used are ionic and/or nonionic emulsifiers and/or protective colloids or stabilizers.

A detailed description of suitable protective colloids is given in Houben-Weyl, Methoden der organischen Chemie, Volume XIV/1, Makromolekulare Stoffe, Georg-Thieme Verlag, Stuttgart, 1961, pp. 411–420. Suitable emulsifiers include anionic, cationic and nonionic emulsifiers. Accompanying surfactants employed are, preferably, exclusively emulsifiers, whose molecular weights—in contrast to the protective colloids—are usually below 2000 g/mol. In the case where mixtures of surfactants are used the individual components must of course be mutually compatible, and in case of doubt this can be checked using a few preliminary experiments. Surfactants used are preferably ionic and nonionic emulsifiers. Common accompanying emulsifiers are, for example, ethoxylated fatty alcohols (EO-units: 3 to 50, $C_8$–$C_{36}$-alkyl), ethoxylated mono-, di- and trialkylphenols (EO units: 3 to 50, $C_4$–$C_9$-alkyl), alkali metal salts of dialkyl esters of sulfosuccinic acid, and alkali metal and ammmonium salts of alkyl sulfates ($C_8$–$C_{12}$-alkyl), of ethoxylated alkanols (EO units: 4 to 30, $C_{12}$–$C_{18}$-alkyl), of ethoxylated alkylphenols (EO units: 3 to 50, $C_4$–$C_9$-alkyl), of alkylsulfonic acids ($C_{12}$–$C_{18}$-alkyl) and of alkylarylsulfonic acids ($C_9$–$C_{18}$-alkyl).

Further suitable emulsifiers are compounds of the formula II

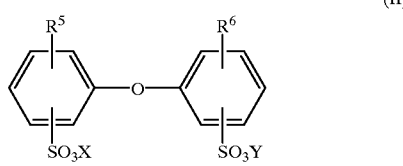

where $R^5$ and $R^6$ are hydrogen or $C_4$–$C_{14}$-alkyl but are not both hydrogen, and X and Y can be alkali metal ions and/or ammonium ions. $R^5$ and $R^6$ are preferably linear or branched $C_6$–$C_{18}$-alkyls or hydrogen, and in particular have 6, 12 or 16 carbons and are not both hydrogen. X and Y are preferably sodium, potassium or ammonium ions, sodium being particularly preferred. Particularly advantageous compounds II are those in which X and Y are sodium, $R^5$ is branched alkyl having 12 carbons and $R^6$ is hydrogen or $R^5$. Use is frequently made of technical-grade mixtures containing from 50 to 90% by weight of the monoalkylated product, an example being Dowfax® 2A1 (trademark of Dow Chemical Company).

Suitable emulsifiers are also given in Houben-Weyl, loc. cit., pp. 192–208.

Examples of trade names of emulsifiers are Dowfax® 2 Al, Emulan® NP 50, Dextrol® OC 50, Emulgator 825, Emulgator 825 S, Emulan® OG, Texapon® NSO, Nekanil® 904 S, Lumiten® I-RA, Lumiten E 3065 etc.

The surfactant is usually employed in amounts of from 0.1 to 10% by weight, based on all of the monomers that are to be polymerized.

Examples of water-soluble initiators for the emulsion polymerization are ammonium salts and alkali metal salts of peroxodisulfuric acid, for example sodium peroxodisulfate, hydrogen peroxide, or organic peroxides, for example tert-butyl hydroperoxide.

Reduction-oxidation (redox) initiator systems are particularly suitable. They consist of at least one, usually inorganic reducing agent and an inorganic or organic oxidizing agent.

The oxidizing component comprises, for example, one of the emulsion polymerization initiators already mentioned above.

The reduction components are, for example, alkali metal salts of sulfurous acid, for example sodium sulfite, sodium hydrogen sulfite, alkali metal salts of disulfurous acid, such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to exist in a plurality of valency states.

Examples of customary redox initiator systems are ascorbic acid/iron(II) sulfate/sodium peroxidisulfate, tert-butyl hydroperoxide/sodium disulfite, tert-butyl hydroperoxide/Na hydroxymethanesulfinate acid. The individual components, for example the reduction component, may also be mixtures, for example a mixture of the sodium salt of hydroxymethanesulfinic acid with sodium disulfite.

The abovementioned compounds are mostly employed in the form of aqueous solutions, in which case the lower concentration is determined by the amount of water which can be accepted in the dispersion, and the upper concentration by the solubility of the compound concerned.

In general the concentration is from 0.1 to 30% by weight, preferably from 0.5 to 2.0% by weight, particularly preferably from 1.0 to 10% by weight, based on the solution.

The amount of initiators is in general from 0.1 to 10% by weight, preferably from 0.5 to 5% by weight, based on all of the monomers that are to be polymerized. It is also possible to use a plurality of different initiators in the emulsion polymerization.

The emulsion polymerization is generally carried out at from 30° to 95° C., preferably from 50° to 90° C. The polymerization medium may consist either of water alone or of mixtures of water with water-miscible liquids such as methanol. Preferably, water alone is used. The emulsion polymerization can be carried out either as a batch process or else in the form of a feed technique, including stepwise or gradient procedures. Preference is given to the feed technique, in which a portion of the polymerization batch is introduced as initial charge, heated to the polymerization temperature and partially polymerized, and then the remainder of the polymerization batch is supplied to the polymerization zone, usually by way of a plurality of spatially separate feeds of which one or more comprise the monomers in pure form or in emulsified form, said feeds taking place continuously, stepwise (in stages) or in accordance with a concentration gradient, all the time continuing the polymerization.

The manner in which the initiator is added to the polymerization vessel in the course of free-radical aqueous emulsion polymerization is known to the skilled worker. It can either be included entirely in the initial charge to the polymerization vessel, or else introduced continuously or in stages, at the same rate at which it is consumed in the course of the free-radical aqueous emulsion polymerization. In each case this will depend, as is familiar to the skilled worker, on both the chemical nature of the initiator system and the polymerization temperature. With preference, a portion is included in the initial charge and the remainder is supplied to the polymerization zone at the same rate at which it is consumed.

In order to remove the residual monomers, initiator is normally also added after the end of the actual emulsion polymerization, i.e. after a monomer conversion of at least 95%.

The individual components can be added to the reactor, in the case of the feed technique, from the top, in the side or from below, through the reactor base.

In the case of the novel process, a portion of the total amount of monomers used is supplied to the polymerization process in the form of a miniemulsion.

Miniemulsions are described, for example, in P. L. Tang, E. D. Sudol, C. A. Silebi and M. S. El-Aasser, Journal of Applied Polymer Science, Vol. 43, 1059–1066 (1991).

Miniemulsions are aqueous emulsions of free-radically polymerizable compounds (monomers). By means of surfactants, for example ionic or nonionic emulsifiers and/or protective colloids, the monomers are emulsified in droplet form in the aqueous phase. Suitable surfactants are those already mentioned above. The amount of surfactants is preferably from 0.1 to 10% by weight, particularly preferably from 0.2 to 5% by weight, based on the amount by weight of the emulsified monomers.

An important feature of the miniemulsion is that the monomer droplets contain, in dissolved form, a compound (co-stabilizer) whose solubility in the monomers is at least two, preferably at least five, times as great as in water.

With particular preference the solubility of this co-stabilizer in water is below 0.001% by weight, especially preferably below 0.0001% by weight, based on a solution of the co-stabilizer in water at 25° C., and the solubility in the monomers of the monomer droplets is more than 0.1% by weight, in particular preferably more than 1% by weight, and especially more than 10% by weight, based on the solution of the co-stabilizer in the monomers of the monomer droplets at 25° C. In particular, the co-stabilizer is infinitely miscible with the monomers of the monomer droplets.

The following substance classes may be mentioned as examples of suitable co-stabilizers:
  a) $C_8$–$C_{30}$ alkanes, especially hexadecane, for example
  b) $C_8$–$C_{30}$ alkyl acrylates, preferably $C_{10}$–$C_{30}$, particularly preferably $C_{12}$–$C_{30}$ alkyl acrylates
  c) polymers, for example free-radically polymerized polymers, polyadducts, for example polyurethanes, or polycondensates, such as polyesters.

With preference, the viscosity of the solution of the co-stabilizer in the monomers of the monomer droplets should also not be too high; in particular, the viscosity should be less than 3000 mPas, preferably less than 1000 mPas, and especially less than 500 mpas, including for example less than 100 mPas.

The proportion of this co-stabilizer is preferably from 0.1 to 50% by weight, particularly preferably 1 to 30% by weight and, with very particular preference, from 2 to 10% by weight, based on the monomers of the miniemulsion.

The mean particle diameter of the emulsified monomer droplets in the miniemulsions is from 10 to 500 nm, preferably from 50 to 400 nm and, with particular preference, from 100 to 300 nm.

The particle diameter in question is the z-average or z-mean particle diameter $\bar{d}_z$, which is determined in accordance with the principle of dynamic, quasielastic light scattering. The particle size was determined using a Coulter N4 Plus Particle Analyzer (Coulter Scientific Instruments).

The measurement is made on an aqueous emulsion containing 0.01% by weight of the co-stabilizer-emulsified monomer droplets. In its aqueous phase, the aqueous emulsion also includes the corresponding monomers of the emulsified monomer droplets in dissolved form (to saturation), so that the emulsified monomer droplets do not dissolve.

The parameter stated is the mean diameter of the unimodal analysis of the autocorrelation function, the z-mean $\bar{d}_z$.

The preparation of miniemulsions is known and is described, for example, in the abovementioned article by P. L. Tang et al. For example, a possible procedure is one in which firstly the surface-active compound is dissolved in water, and secondly the co-stabilizer is dissolved in the monomers. The two solutions are then combined and homogenized to give the desired miniemulsion. In conventional process engineering the continuous preparation of miniemulsions is done using, inter alia, high-pressure homogenizers. In these machines the components are emulsified by a high local input of energy. In practice, two different variants have become established.

In the first variant, the emulsion is compressed to more than 100 bar using a piston pump and is then released through a narrow gap. In this instance, the action is based on an interplay of high shear gradients and pressure gradients and cavitation in the gap. One example of a high-pressure homogenizer which operates in accordance with this principle is the Niro-Soavi high-pressure homogenizer model NS1001L Panda.

In the second variant, the compressed liquid is released through two opposing nozzles into a mixing chamber. In this case, the emulsifying action is dependent in particular on the hydrodynamic conditions within the mixing chamber. One example of such machines is the Microfluidizer model M120 E (Microfluidics Corp). In this high-pressure homogenizer, the emulsion is compressed to a maximum of 1200 bar by means of a pneumatic piston pump and is released by way of an "interaction chamber". In the interaction chamber the emulsion jet is divided, in a microchannel system, into two jets which are caused to intersect at 1800. Another example of this homogenization is the Nanojet (model Expo; Nanojet Engineering GmbH). This high-pressure homogenizer operates in accordance with the same principle as the Microfluidizer. However, in the case of the Nanojet, the solid channel system is replaced by two homogenizing valves which can be adjusted mechanically.

In addition to the abovementioned principles, however, it is also possible to produce emulsions with the aid of ultrasound (for example a Branson Sonifier II 450). In this case the reduction in size in the particles is based on cavitation mechanisms. However, the quality of the emulsions produced in the sonication field depends not only on the sonication output employed but also on other factors, such as, for example, the distribution of intensity of the ultrasound in the mixing chamber, the residence time, the temperature, and the physical properties of the substances to be emulsified, such as their toughness, surface tension and vapor pressure. In this case, the particle size of the monomer droplets depends on the concentration of the emulsifier and co-stabilizer and on the energy which is input in the course of homogenization, and said particle size can be adjusted, for example, by making appropriate changes to the homogenization pressure and/or to the corresponding ultrasound energy.

In the novel process preferably from 0.1 to 10% by weight, particularly preferably from 0.2 to 5% by weight, of all of the monomers that are to be polymerized are supplied to the polymerization process in miniemulsion form. For example, miniemulsion can be introduced as initial charge, and then the other monomers metered in, or else it can be added during polymerization.

It is preferred to add the miniemulsion before a conversion of 95% by weight, particularly preferably 70% by weight and, with very particular preference, 50% by weight of all the monomers that are to be polymerized is reached.

The addition of miniemulsions during polymerization can be carried out continuously, over a defined period, or batchwise. The miniemulsion is preferably added in the form of a single batch.

The monomer composition of the miniemulsions may be different from that of the monomers which are included in the initial charge and/or are supplied in a form other than that of the miniemulsion.

The novel process produces a polymer dispersion with a bimodal particle-size distribution. It is surprising that the polymerization gives rise to a polymer particle species which can be distinguished from the other polymer particles, and whose particle number corresponds largely to the number of monomer droplets in the miniemulsion, and whose particle size depends directly on the established size of the monomer droplets in the miniemulsion. The size of the polymer particles can, furthermore, be established or influenced by means of conventional methods, for example by the concomitant use of a seed polymer of defined particle size, which in the case of the emulsion polymerization can be included in the initial charge in an amount, for example, of from 0.05 to 10% by weight, based on the overall amount of monomers that are to be polymerized.

In accordance with the novel process it is possible to obtain polymer dispersions having a high solids content, for example more than 50% by weight, in particular more than 60% by weight, and even more than 70% by weight. The polymer dispersions are low in viscosity even at a high solids content.

Particularly preferred polymer dispersions have a bimodal particle-size distribution, in which from 0.1 to 80% by weight, in particular from 1 to 50% by weight, of the polymer has a particle size $\bar{d}_w$ of from 20 to 500 nm, in particular from 50 to 300 nm and 20 to 99.9% by weight, in particular from 50 to 99% by weight, of the polymers has a particle size $\bar{d}_w$ of from 200 to 1500 nm, in particular from 300 to 900 nm, the particle sizes differing by at least 50 nm, in particular by at least 100 nm and, with very particular preference, by at least 200 nm. The measurement method for determining $\bar{d}_w$ is described by the examples.

EXAMPLES (Percentages are by weight)
Preparation of the miniemulsion

For the preparation, part-stream b) is introduced as initial charge, part-stream a) is added with stirring, and the emulsion is then stirred normally for 10 minutes more before being homogenized with a Niro Soavi high-pressure homogenizer model NS1001L Panda. To homogenize the emulsions, one pass at 850 bar was carried out.

In the Examples below, the miniemulsion was in each case added as feed stream 3; the composition of the part-streams a) and b) is indicated under feed stream 3.

Determining the particle size of the resulting polymer dispersion

To determine the high-resolution particle-size distribution ($\bar{d}_w$) of the latex particles an analytical ultracentrifuge was used (particle-size distribution—PSD measurement). This measurement method is described in detail by W. Machtle in "Analytical Ultracentrifugation in Biochemistry and Polymer Science", S. E. Harding et al. (Eds.), Royal Society of Chemistry, Cambridge, England 1992, Chapter 10.

Example 1

Initial charge: 458.2 g of water 4.55 g of polystyrene seed 33% strength (diameter 28 nm)

Feed stream 1: 488.75 g of water 10.0 g of Lumiten IRA (60% strength) 21.7 g of Dowfax 2A1 (an emulsifier, 45% strength in water) 15.0 g of acrylic acid 1485.0 g of butyl acrylate Feed stream 2: 175.5 g of water 4.5 g of sodium peroxodisulfate Feed stream 3: a) 30 g of butyl acrylate 2.4 g of Acronal A 150F, a resin based on poly-n-butyl acrylate b) 0.0 g of sodium bicarbonate 0.1 g of sodium lauryl sulfate (SLS) 129. g of water particle size: 130 nm ($\bar{d}_z$)

Feed stream 1 and 2 started simultaneously at 85° C. 20% of the feed stream 2 were metered in 10 minutes, the remainder in 2 hours and 20 minutes. Feed stream 1 was metered in over two hours. Feed stream 3 was added 10 minutes after the start of the feeds.

A bimodal particle-size distribution was obtained, where 13% by weight of the particles had a diameter $\bar{d}_{w1}$ of 186 nm and 87% by weight of the particles had a diameter $\bar{d}_{w2}$ of 286 nm.

Example 2

Initial charge: 458.2 g of water 4.55 g of polystyrene seed 33% strength (diameter 28 nm)

Feed stream 1: 470.34 g of water 10.0 g of Lumiten IRA (60% strength) 21.7 g of Dowfax 2A1 (45% strength) 15.0 g of acrylic acid 1485.0 g of butyl acrylate Feed stream 2: 175.5 g of water 4.5 g of sodium peroxodisulfate Feed stream 3: a) 30 g of butyl acrylate 2.4 g of Acronal A 150F b) 0.06 g of sodium bicarbonate 0.18 g of SLS 129.5 g of water particle size: 130 nm Feed stream 4: 22.5 g of sodium disulfite (10%)

The procedure of Example 1 was repeated with the exception that, 10 minutes after the start of feed streams 1 and 2, first feed stream 4 and then feed stream 3 were added. 14% by weight with $\bar{d}_w$ =162 nm and 86% by weight with $\bar{d}_{w2}$=266 nm In Examples 3 to 10 below, the only difference relative to Example 1 was in each case the composition of feed stream 3 and, if used, of the other feeds, and the initial charge of seed.

Example 3

Feed stream 3: a) 24 g of styrene 6 g of stearyl acrylate b) 0.06 g of sodium bicarbonate 0.18 g of SLS 120 g of water particle size: 152 nm Polymer: $\bar{d}_{w1}$: 188 nm, 10% by weight $\bar{d}_{w2}$: 268 nm, 90% by weight

Example 4

Feed stream 3: a) 27.6 g of butyl acrylate 2.4 g of oligopropene acrylate b) 2.4 g of Acronal A 150F 0.06 g of sodium bicarbonate 0.18 g of SLS 120 g of water particle size: 152 nm Polymer: $\bar{d}_{w1}$: 162 nm, 18% by weight $\bar{d}_{w2}$: 268 nm, 82% by weight

Example 5

Feed stream 3: 30 g of butyl acrylate 2.4 g of Modaflow, a soft, polyacrylate-based resin from Monsanto 0.0 g of sodium bicarbonate 0.1 g of SLS 120 g of water particle size: 135 nm Polymer: $\bar{d}_{w1}$: 162 nm, 14% by weight $\bar{d}w_{w2}$: 262 nm, 86% by weight

Example 6

Feed stream 3: a) 30 g of butyl acrylate 1.8 g of Styrolux 684D, a styrene-butadiene-block copolymer b) 0.06 g of sodium bicarbonate 0.18 g of SLS 127 g of water particle size: 245 nm Polymer: $\bar{d}_{w1}$: 180 nm, 10% by weight $\bar{d}_{w2}$: 276 nm, 90% by weight

Example 7

Feed stream 3: a) 30 g of styrene 0.54 g of hexadecane b) 0.06 g of sodium bicarbonate 0.18 g of SLS 122 g of water Polymer: $\bar{d}_{w1}$: 210 nm, 10% by weight $\bar{d}_{w2}$: 276 nm, 90% by weight

Example 8

Initial charge: 310.0 g of water 129.63 g of polyacrylate seed 54% strength (diameter 363 nm)

Feed stream 1: 320.17 g of water 10 6.7 g of Lumiten IRA (60% strength) 14.4 g of Dowfax 2A1 (45% strength) 10.0 g of acrylic acid 990.0 g of butyl acrylate Feed stream 2: 1170 g of water 3.0 g of sodium peroxodisulfate Feed stream 3: a) 20 g of butyl acrylate 1.76 g of Acronal A 15OF b) 0.04 g of sodium bicarbonate 0.12 g of SLS 86.4 g of water particle size: 120 nm Polymer: $\bar{d}_{w1}$: 250 nm, 50% by weight $\bar{d}_{w2}$: 768 nm, 50% by weight

Example 9

Initial charge: 210 g of water 118.64 g of polyacrylate seed 59% strength by weight (diameter 366 nm)

Feed stream 1: 102.32 g of water 6.7 g of Lumiten IRA (60% strength), 14.4 g of Dowfax 2A1 (45% strength) 10.0 g of acrylic acid 999.0 g of butyl acrylate Feed stream 2: 39.9 g of water 3.0 g of sodium peroxodisulfate Feed stream 3: a) 20.0 g of butyl acrylate 2.4 g of Acronal DS 3435X, a polybutyl acrylate-based resin b) 0.04 g of sodium bicarbonate 0.12 g of SLS 86.4 g of water particle size: 137 nm Polymer: $\bar{d}_{w1}$: 230.9 nm, 42.2% by weight $\bar{d}_{w2}$: 656.8 nm, 57.8% by weight Solids content 69% by weight Viscosity at a shear rate of 250 s-1: 660 mPas (determined using a Contraves Rheomat 115)

Example 10

Initial charge: 310.0 g of water 118.64 g of polyacrylate seed 59% strength by weight of (diameter 366 nm)

Feed stream 1: 100.46 g of water 6.7 g of Lumiten IRA (60% strength) 14.4 g of Dowfax 2A1 (45% strength) 10.0 g of acrylic acid 999.0 g of butyl acrylate Feed stream 2: 39.9 g of water 3.0 g of sodium peroxodisulfate Feed stream 3: a) 20.0 g of butyl acrylate 2.4 g of Acronal DS 3435X b) 0.04 g of sodium bicarbonate 0.12 g of SLS 86.4 g of water particle size: 137 nm $\bar{d}_{w1}$: 245 nm, 47.4% by weight $\bar{d}_{w2}$: 660 nm, 52.6% by weight solids content 65.8% by weight Viscosity at a shear rate of 250 s$^{-1}$: 180 mPas (determined using a Contraves Rheomat 115)

Example 11

Relative to Example 2, only the composition of feed stream 3 was changed.

Feed stream 3: 24 g of styrene 6 g of stearyl acrylate 0.06 g of sodium bicarbonate 0.18 g of SLS 120 g of water particle size: 152 nm Polymer: $\bar{d}_{w1}$: 178 nm $\bar{d}_{w2}$: 264 nm Comparison Examples V1, V3, V6, V7

Comparison Examples V1, V3, V6 and V7 were carried out corresponding to Examples 1, 3, 6 and 7.

The only difference was that, when preparing the miniemulsion (feed stream 3) no homogenization was carried out, so that a miniemulsion was not formed.

The resulting particle-size distribution of the polymer dispersion was-monomodal in every case:

|    | $\bar{d}_w$ |
|----|-------------|
| V1 | 291 nm      |
| V3 | 285 nm      |
| V6 | 285 nm      |
| V7 | 276 nm      |

We claim:

1. A process for preparing an aqueous polymer dispersion by emulsion polymerization of free-radically polymerizable compounds (monomers), which comprises adding, before or during the polymerization of the monomers, a miniemulsion which is an aqueous, surfactant-stabilized emulsion of monomers whose emulsified droplets have a size of from 10 to 500 nm and which comprises a compound (co-stabilizer) which is dissolved in the monomers of the droplets and whose solubility in the monomers is at least twice its solubility in water, wherein said co-stabilizer is selected from the group consisting of a $C_8$–$C_{30}$ alkane, a $C_8$–$C_{30}$ alkyl acrylate and a polymer; wherein said $C_8$–$C_{30}$ alkane is hexadecane; said $C_8$–$C_{30}$ alkyl acrylate is a $C_{10}$–$C_{30}$ alkyl acrylate; and said polymer is selected from the group consisting of a polyurethane and polyester.

2. A process for preparing an aqueous polymer dispersion by emulsion polymerization of free-radically polymerizable compounds (monomers), which comprises adding, before or during the polymerization of the monomers, a miniemulsion which is an aqueous, surfactant-stabilized emulsion of monomers whose emulsified droplets have a size of from 10 to 500 nm and which comprises a compound (co-stabilizer) which is dissolved in the monomers of the droplets and whose solubility in the monomers is at least twice its solubility in water, wherein said aqueous polymer dispersion has a bimodal particle size distribution;

wherein said co-stabilizer is selected from the group consisting of a $C_8$–$C_{30}$ alkane, a $C_8$–$C_{30}$ alkyl acrylate and a polymer; and wherein said $C_8$–$C_{30}$ alkane is hexadecane; said $C_8$–$C_{30}$ alkyl acrylate is a $C_{10}$–$C_{30}$ alkyl acrylate; and said polymer is selected from the group consisting of a polyurethane and a polyester.

* * * * *

UNITED STATES PATENT AND TRADEMARK OFFICE
CERTIFICATE OF CORRECTION

PATENT NO. : 5,990,221

DATED : November 23, 1999

INVENTOR(S): Burkhardt DAMES et al.

It is certified that an error appears in the above-identified patent and that said Letters Patent is hereby corrected as shown below:

On the title page, item [30], the Foreign Application Priority Data is missing. It should read as follows:

--[30] Foreign Application Priority Data

Jul. 12, 1996 [DE] Germany......................196 28 142.3--

Signed and Sealed this

Third Day of April, 2001

Attest:

NICHOLAS P. GODICI

*Attesting Officer*   *Acting Director of the United States Patent and Trademark Office*